(12) United States Patent
Navas

(10) Patent No.: US 8,296,303 B2
(45) Date of Patent: Oct. 23, 2012

(54) INTELLIGENT EVENT QUERY PUBLISH AND SUBSCRIBE SYSTEM

(75) Inventor: Julio Navas, Concord, CA (US)

(73) Assignee: SAP AG, Walldorf (DE)

( * ) Notice: Subject to any disclaimer, the term of this patent is extended or adjusted under 35 U.S.C. 154(b) by 287 days.

(21) Appl. No.: 12/622,387

(22) Filed: Nov. 19, 2009

(65) Prior Publication Data

US 2010/0125584 A1  May 20, 2010

Related U.S. Application Data

(60) Provisional application No. 61/116,622, filed on Nov. 20, 2008.

(51) Int. Cl.
*G06F 17/30* (2006.01)
*G06F 7/00* (2006.01)
(52) U.S. Cl. ........................................ 707/747; 707/803
(58) Field of Classification Search .................. 707/747, 707/803
See application file for complete search history.

(56) References Cited

U.S. PATENT DOCUMENTS

| | | | |
|---|---|---|---|
| 6,931,392 B1 | 8/2005 | Skeen | |
| 7,072,800 B1 * | 7/2006 | Fernandez et al. | 702/186 |
| 7,383,255 B2 | 6/2008 | Desai et al. | |
| 7,464,386 B2 * | 12/2008 | Millington et al. | 719/331 |
| 7,669,187 B2 * | 2/2010 | Liu et al. | 717/124 |
| 2006/0004815 A1 | 1/2006 | Murata et al. | |
| 2007/0226062 A1 * | 9/2007 | Hughes et al. | 705/14 |
| 2008/0033958 A1 | 2/2008 | Richards et al. | |

OTHER PUBLICATIONS

Cohen et al, Descriptive Naming of Context Data Providers, 2005 CONTEXT, pp. 112-125.*
European Search Report for European Application No. 09014493.2 Mailed Mar. 17, 2010, 9 Pages.
Non-Final Office Action for U.S. Appl. No. 12/622,383, Mailed Oct. 3, 2011, pages.
Non-Final Office Action for U.S. Appl. No. 12/622,396, Mailed Oct. 26, 2011.
Notice of Allowance for U.S. Appl. No. 12/622,383, mailed Feb. 29, 2012, 12 pages.
Langegger, Andreas , et al., "Sharing Data on the Grid using Ontologies and distributed SPARQL Queries", Database and expert systems application, 2007. 18th International conference, IEEE, Piscataway, NJ, USA, Sep. 1, 2001, 5 Pages.
Moy, John T., "Multicast Extensions to OSPF", Request for Comments 1584 (rfc1584). Mar. 1994; downloaded on Mar. 17, 2009 from http://wwwrfc-editor.org/rfc/rfc1584.txt, 51 pages.

(Continued)

Primary Examiner — Kuen Lu
(74) Attorney, Agent, or Firm — Blakely Sokoloff Taylor & Zafman LLP

(57) ABSTRACT

Indexing and routing to event data is described. Event data is assigned an identifier that identifies the data type and the contents of event data within an enterprise system. The event data may be real-time event data. With the identifier, a source of the event data is determined, and the source can be queried for the event data in real-time. The identifier is indexed along with other event data identifiers. Based on the location of the event data, the system sends out a query toward the data source to obtain the information, but also to route the query to the data source, rather than attempting to pull data towards the query source and process it at the query source.

15 Claims, 8 Drawing Sheets

OTHER PUBLICATIONS

Moy, John T,, "OSPF Version 2", RFC 2328 (rfc2328). The Internet Engineering Task Force, 48377 Fremont Blvd. Suite 117, Fremont, CA 94538, USA, Apr. 1998; downloaded on Mar. 17, 2009 from http://rfc.dotsrc.org/rfc/rfc2328.html, 246 pages.

Thuraisingham, Bhavani, et al., "Design and Implementation of a Distributed Database Inference Controller", Proceedings of the annual international computer software and applications Conference, Phoenix, Nov. 1-5, 1993; Los Alamitos, IEEE Comp. Soc. Press, US, vol. Conf. 17, Nov. 1, 1993, 7 Pages.

Final Office Action from U.S. Appl. No. 12/622,396, mailed May 15, 2012, 13 pages.

Bowman, Mic, et al., "Reasoning About Naming Systems", *ACM Transactions on Programming Languages and Systems*, vol. 15, No. 5, Nov. 1993, 31 Pages.

* cited by examiner

# INTELLIGENT EVENT QUERY PUBLISH AND SUBSCRIBE SYSTEM

RELATED APPLICATIONS

This application is based on U.S. Provisional Application 61/116,622 filed Nov. 20, 2008, and claims the benefit of priority of that provisional application. Furthermore, the provisional application is hereby incorporated by reference.

FIELD

The invention is generally related to enterprise data management, and more particularly to routing queries for event data from query sources to sources of the event data.

COPYRIGHT NOTICE/PERMISSION

A portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2009, SAP AG, All Rights Reserved.

BACKGROUND

Consider an enterprise having multiple systems and potentially multiple geographic locations. Each transaction of the enterprise with an external entity, and many operations within the enterprise on data and/or systems, generates data. The data may indicate changes in inventory, information about sales and customer relations, etc. Data is generally associated with data objects, and frequently, business objects or data objects having a business context. The change to data associated with one or more objects (e.g., business objects or other objects) is referred to herein as an event. Enterprises generally need to keep track of the events, process the generated data (as may be indicated by the event), and make decisions based on the event.

Traditionally, enterprises store events in operational databases (operational data stores) among many subsystems within the enterprise, which may include subsystems that are hosted on separate machines, and may be geographically separated. An example of geographic separation of subsystems may be a system local to production plant in one city, and a system local to a distribution plant that could be in a different region, different state, different country, or different continent. There is generally a problem within enterprises, especially as the enterprise grows and as business expands geographically, where the enterprise has "too much" data and "too many" systems. While it is understood that "too much" and "too many" are relative terms, the general problem is that the amount of resources required to handle the data and the systems is higher than the enterprise is capable of providing or is willing to provide. When there is too much data and too many systems, the enterprise loses operational data visibility across the enterprise, and any process for handling events becomes very time consuming and expensive.

For example, consider a business that has more than 100 different enterprise systems located in various locations throughout the world. The data is gathered and stored in an operational database, e.g., an online transaction processing (OLTP) database. If someone within the business wanted to answer a question based on the operational data, or the data generated as events, creating a new operational report may not be a possibility. In research on the subject, it was found that in certain cases, such an operational report cannot be created in less than 6 months. The business traditionally has to search multiple stacks to extract and transform the data before creating an operational report. The searching, extracting, and transforming would need to be repeated for each of the different systems in place, which would require the use of many people and systems. Thus, such an operational report is not even considered a possibility because of the inability to access and transform the data in a cost-effective manner.

In general, it has been found that businesses do not have tools that are specific to operational data. As mentioned above, the operational data only exists as an interim state of data that is then stored in data warehouses and a centralized database to hold the operational data store. Use of the data has then required a great deal of programming around the database to make the data accessible.

Additionally, passing the data back and forth throughout the enterprise may have deficiencies in being able to make sense of the information. The use of digital libraries or data stores as discussed above does not help users make sense of the data. Without coordination, the data is difficult to find and obtain, which is one problem leading to the costs mentioned above. Historically, information retrieval from digital libraries or similar data stores required having bitmaps for coordination. The bitmaps had a meaning pre-determined for every single bit in the bitmap. When the amount of data becomes as large as what occurs with modern enterprises, the size of the bitmaps is prohibitive to map meaning to data. Additionally, the use of bitmaps has traditionally been used only to address data stored within a data store, and cannot assist in accessing real-time data throughout the enterprise.

Thus, event data within and outside an enterprise has been inaccessible except through a vast amount of enterprise time and cost to analyze and report on the data. The vast amounts of time and cost make the data generally inaccessible to information workers within the enterprise.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
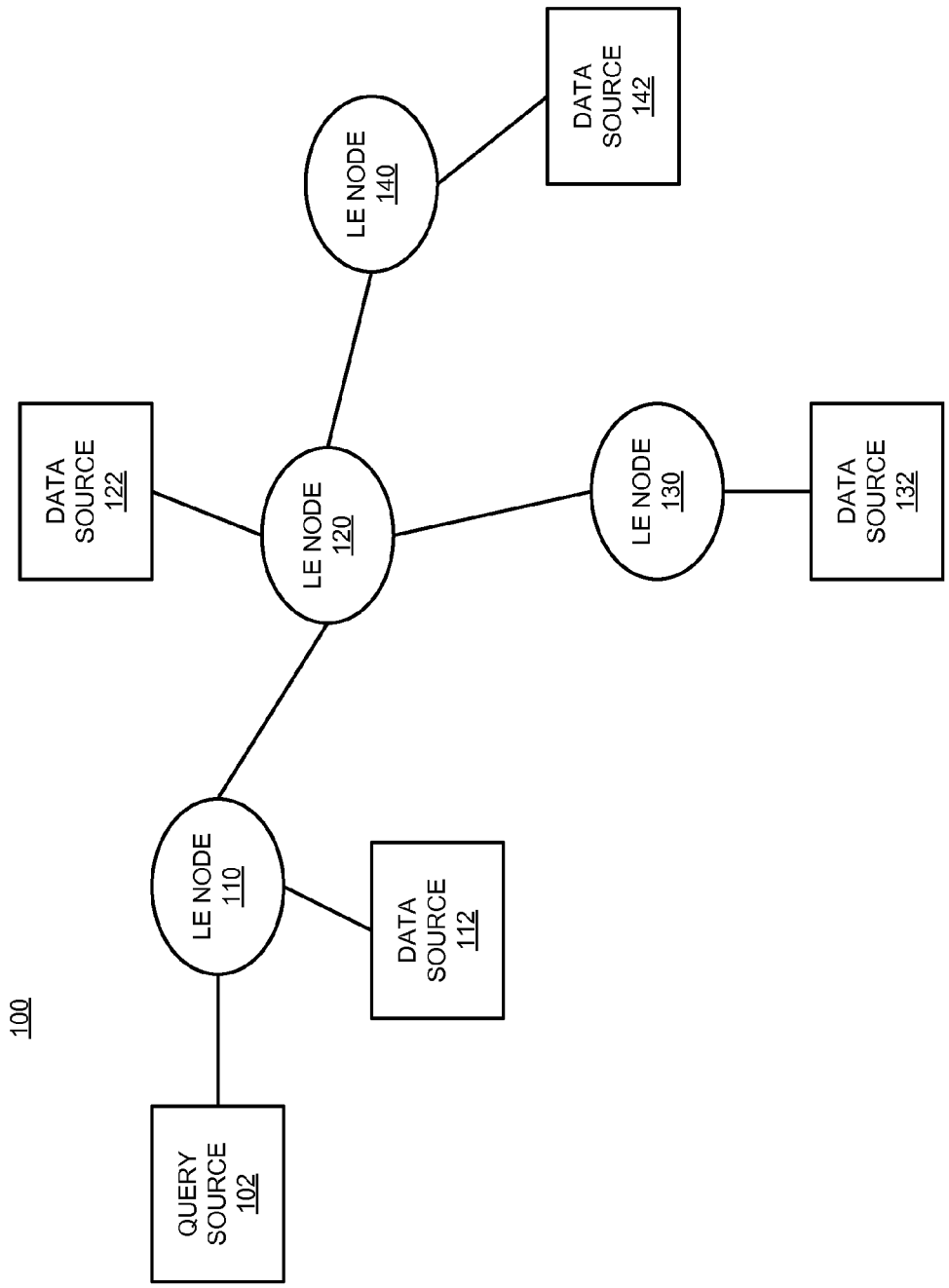
FIG. 1 is a block diagram of an embodiment of an enterprise system that supports query routing for real-time event data.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Indexing and routing as described herein enables access to real-time event data within an enterprise. Queries are sent to data sources to enable access to real-time data. The system that enables the routing of queries to the data sources coordinates data through indexing with descriptive labels or identifiers that indicate a location and contents of the data. In one embodiment, coordination is accomplished through the use of equations, rather than using bitmaps having a distinct meaning for every individual bit. Thus, a sort of "bitmap" that will be referred to herein as a bit vector may be generated, and will have a meaning not based on the individual bits set, but based on operation on the identifier with equations to extract meaning The bitmap as used herein is a bit vector (a sequence of '1's and '0's) that exposes meaning based on an operation or calculation on the bit vector. The query routing nodes within the enterprise may all be configured with the same equations, which set or unset bits in a bit vector, allowing the equations to set the meaning Thus, an individual bit may or may not indicate a particular meaning, but the equations determine what the bits mean.

In one embodiment, the indexing is part of a system that handles access to real-time event data within an enterprise. Briefly, consider an enterprise system that includes multiple data sources. Real-time event data may be obtained from the data sources via query. A query is generated at a client device and propagated through the enterprise network to the data source. The query is parsed into component parts or components, and each component part is sent to a data source that generates the event data associated with the component part of the query. In one embodiment, the enterprise system identifies query components that are related to identical event information from a data source of the enterprise, and merges the queries. Thus, the enterprise system can send a single query to the data source for the event information, receive the response, and send the response to the query sources. Note that the queries are sent to the source of the event data, and are responded to with real-time event data. Contrast such an approach with current data warehousing and querying a repository of information. Current data warehousing techniques collect, organize and store data from disparate sources in a central repository. The information is always latent.

The enterprise system that supports the event query processing as described herein may be referred to as an "eventing" system or event network. It will be understood that different terminology may be used, and an eventing system could more specifically be implemented as a "business event network" that handles queries and data sources related to business events with changes to business objects and business processes. The general concept of an eventing system is a system that resides on top of an enterprise system that allows the system to provide greater understanding of the data within the enterprise system. The eventing system in particular allows access to operational or real-time event data, and performing of actions based on the events (e.g., performing an operation on a returned data object). For purposes of description herein, and not by way of limitation, such a system is referred to below as a "Live Enterprise" (LE) system. The teachings herein will be understood as being applicable to any similar event network that accesses real-time data and/or sends queries towards data sources, or otherwise handles queries as described.

As used herein, operational or real-time event data refers to data that is substantially newly generated within the enterprise system. Newly generated data is data that is newer than data that would generally be warehoused in the enterprise system. Thus, operational or real-time data includes data that has not yet been warehoused in a database, and/or is not subject to standard data query mechanisms. Non-real-time data, or data that is stored in a data warehouse or database can also be accessed in response to a query. Non real-time data can also be referred to as historical data. The LE system can thus access and provide event information, whether real-time or non-real-time in response to queries.

An enterprise system refers to the network of computers and interconnection equipment within a company or organization. The enterprise system includes software components such as the servers and management systems. Each element of hardware and software within the enterprise system may be referred to as a subsystem, or simply "system" (thus, the enterprise system may be considered a system of systems). The enterprise system as described herein includes data sources. The data sources may be any subsystem (e.g., supply chain management (SCM), enterprise resource planning (ERP), human resources, customer relations management (CRM), information technology (IT), etc.), database (relational, object oriented, transactional multi-dimensional, hierarchical), or other element within the enterprise that implements a change to one or more objects (e.g., structured objects, including business objects that generally are part of a business context such as a "Customer" object). Each change to an object may be referred to as an event.

In one embodiment, as described herein, an enterprise system includes query processing entities within the network. The query processing entities may be software and/or hardware components within the enterprise network. The query processing entities receive and process requests for the event data. The query processing entities parse or separate user queries into component parts and send the component parts to the data sources that have the requested information. The routing of event queries for real-time event data may be performed as described herein.

In response to the queries, in one embodiment, the data sources provide a response to the query processing entities, which then return results to the query source. Note that the query components may be provided to enterprise nodes directly coupled to the data sources, but for simplicity in explanation, the description herein may refer simply to sending a query to a data source. Sending a query to a data source may include sending the query to a next hop on a path towards a data source, as indicated by routing tables, routing indexes, etc., based on what data the data source is advertised throughout the network as providing. Note also that results may be partial results from query components. Thus, to provide a complete result, in one embodiment the query processing entity compiles the query component responses to generate a complete query response to send to the query source. In an alternative embodiment, the query processing entity returns all query responses to the query sources, and each query source may include an agent to compile the component query results into a complete query response. The composite of the responses to the query components may be referred to as an event, which is described in more detail below. In one embodiment, a returned event includes an object, or an instance of an object, that has particular data and actions associated with it. Operation on the actions can result in changes within the enterprise system. One or more enterprise services enable interaction with the event.

Further detail and examples on query parsing and routing, including separation and selective, intelligent combination of query components is described in more detail in U.S. patent application Ser. No. 12/622,396, entitled, "Stream Sharing for Event Data within an Enterprise Network," and U.S. patent application Ser. No. 12/622383, entitled, "Federating Business Event Data within an Enterprise Network," both having common inventorship, and filed concurrently herewith. Further detail and examples of HSPF are described in U.S. patent application Ser. No. 12/622,391, entitled, "Hierarchical Shortest Path First Network Routing Protocol," of Navas et al., filed concurrently herewith.

FIG. 1 is a block diagram of an embodiment of an enterprise system that supports query routing for real-time event data. Enterprise network 100 illustrates a network of nodes within the enterprise. The nodes illustrated are enabled for query processing as described herein. For purposes of description, such nodes will be referred to as "Live Enterprise" (LE) nodes. It will be understood that other labels/designators could be used to identify enterprise nodes that process queries as described herein to provide access to real-time event data. LE nodes 110, 120, 130, and 140 are not constrained to a particular network architecture or physical layout. Rather, the LE nodes may be geographically separated or at the same geographic location, have the same or different network connection types as each other, and may be connected via private and/or public networks. In one embodiment, different nodes are in different enterprise networks, such as partners or other cooperative networks. Thus, the nodes need not be all within the same physical network, and need not be within the same enterprise.

Query source 102 represents a client device that connects with enterprise network 100. Thus, query source may be a laptop or desktop computer, a handheld device (e.g., a networked phone or other device), or any other type of device that allows a user to interact with enterprise network 100. The form of the query is described in more detail below. The query source has hardware components and user interface and software components.

Each node 110, 120, 130, and 140 is illustrated with an associated data source 112, 122, 132, and 142, respectively. Each node may have zero or more associated data sources. Each data source is local to the node, e.g., directly connected, in communication without using another Liver Enterprise node, directly addressable using a local schema. Each data source is an event producer. An event producer is a source of events that may be of interest to someone within the enterprise (e.g., the user of query source 102). Events include any type of transaction or system operation change, such as an inventory level dropping below a threshold, the occurrence of a threshold number of faults within a system, etc.). Each data source 112, 122, 132, 142 generates event data as is conducted and transactions occur. In one embodiment, the event producer enriches situation-specific information (such as an inventory level drop) with metadata. The metadata could be attributes and contextual data related to the specific situation. By enriching such information, an event producer can create an instance of an event that can be independently processed by other entities in the enterprise, through other entities that can process query information as described herein. The combination of all query processing entities may be referred to as a Live Enterprise architecture, which may include event producers, event brokers (e.g., entities that can route queries, access event information, and return query responses), and event consumers (e.g., the query source). In one embodiment, the LE architecture is incorporated into an enterprise system available from SAP AG, of Walldorf Germany. Subsystems available under the SAP enterprise system include MySAP ERP (enterprise resource planning), CRM (customer relationship management), SCM (supply chain management), and SAP B1 (Business One). Additionally, the LE architecture could be incorporated into an enterprise system that includes non-SAP systems and/or RFID (radio frequency identifier) systems, transactional systems, inventory management systems, general ledger systems, and the like.

As mentioned above, each data source 112, 122, 132, and 142 may represent one or more subsystems that generate event data. The data sources at a single node need not be of the same type. Thus, for example, any number of different system could each produce event data, such as an ERP system, a database interface system, a CRM system, etc. In one embodiment, the event producer represented by the data sources publishes or makes available all event data. Alternatively, the event producer may internally filter events and determine which event should be notified externally through a determination algorithm. Such a determination algorithm could be rules-based as to event type, event significance, etc., will be considered information to share externally. Each data source can be considered to have a relationship with the events it produces. Thus, the event is associated with a data source, in contrast to an event being associated with an application that consumes the event, as with current systems.

Each LE node 110, 120, 130, and 140 represents an event broker, and the interconnection/networking of the nodes can be considered an event bus. Each node is an LE node because there are components local to each node that enables the node to participate in the LE network, processing and routing real-time event data as described herein. The event broker can exist on a "platform," such as an enterprise system that is leveraged to exchange query information. Examples of an event broker platform may be SAP XI. In one embodiment, the event bus components may be understood as logical entities in enterprise network 100 to facilitate the transmission and propagation of messages and events between clients, as well as enterprise services to manage event metadata and context. Each LE node as an event broker is at the same time a target and a source of the events. Nodes 110, 120, 130, and 140 filter, aggregate, and manage the distribution of events received from the data sources 112, 122, 132, and 142 (the event producers) to query source 102 (an event consumer). Each LE node can direct queries toward the appropriate data source(s) via indexing of the contents and location of event data within enterprise network 100. The indexing is described in more detail below.

In one embodiment, a query may be considered a "real-time" query that exists before the event information exists. Thus, a user of query source 102 may subscribe to particular events, or define certain events that are of interest to the user. Event information can also be queried as would normally be understood, by a user generating a query that is then sent out.

However, some queries may be "standing queries" that represent monitoring of events within the enterprise. Such standing queries may be patterns of occurrences or events that would be of interest. Consider that query source 102 specifies interest in particular events by subscribing to the events. LE node 110 as the broker works seamlessly behind the scenes to expose query source 102 only to the events related to the specified events. Therefore, the event broker provides the ability to publish, route, orchestrate, and consume events via a reliable, highly available enterprise-services enabled technology platform. Context based intelligence may be incorporated into these processes via a rules engine. A rules engine at the data sources can filter what information to make available, and a rules engine at the LE nodes can filter what information to send to the query source.

As suggested above, the event data may be available through a publish-subscribe mechanism. A subscription is a unidirectional relationship between two endpoints where one endpoint, acting as a subscriber, pulls data from the other endpoint (which acts as a publisher). The data sources, as publishers, make event data available, and may indicate the types of information available to subscribe to. The query source, as a subscriber, receives event data from the data sources based on the subscription. A subscription can define the exact type and the conditions under which the events should be notified to the query source. The LE nodes manage the distribution of events received from the data sources to the query source. In one embodiment, the LE nodes are enabled to aggregate event query data. For aggregation of events, the LE nodes correlate various events which may appear in any order and at different points of time.

The LE nodes have an understanding of the format in which a query source can receive event data. Thus, event data produced by a data source may be of a format that is inconsistent with the system through which the query was generated, or incompatible with the format expected by the user. In one embodiment, the LE node through which the query source accesses the enterprise network stores information that indicates the formatting of the query source. Thus, the LE node may transform or modify received event data for consumption by the query source. The LE nodes provide connectivity to underlying enterprise systems, and link to metadata definitions of events. The LE nodes may also translate events to the format required by underlying systems where actions are to be performed.

As mentioned above, query source 102 provides an example of an event consumer. The event consumer may be a user or an automated system such a software or hardware component with logic to consume and act on business events. The automated system can include, but does not need, user interface capabilities. As well a user can also be considered the event consumer for purposes of simplicity in description herein. The event consumer may be the entity that acts upon received event information. Acting upon an event may involve interaction with the event producer (i.e., the underlying system or systems that generated the data), the event broker (the LE nodes), or other systems. To act on an event, the event consumer may need to obtain event context, such as context derivable from master data within the enterprise system. Master data is understood to be data stored and accessible centrally within the enterprise.

As mentioned above, in one embodiment, "interest" in data may be indicated through a subscription by the user. Alternatively, interest in data may be automatically deduced based on a role of the user (e.g., all vice presidents (VPs) receive certain information, all project managers receive other event information related to the particular project, etc.). For scalability, the LE architecture can enable distributed parallel processing across multiple local event routers. In one embodiment, event routing uses a push (as opposed to a pull) mechanism, which is a push from data sources to query sources.

A user can perform actions based on the event data. In one embodiment, a user can create an event execution node by interacting with the LE system, which interacting may include personalizing a new event. The creating of the event execution node is a separate computer process from the obtaining the event data. The creating of the event execution node is dedicated to detecting a single higher-level event through the correlation of information from multiple different sources or event streams. Once the event is detected, the LE system (through the LE nodes) can enrich an event through predetermined data access calls, cause changes to occur in underlying systems, push information to the user in a selected or preferred channel (e.g., SMS to a cell phone, email, etc.), or publish one or more event streams of its own.

In one embodiment, each LE node may include a distributed metadata repository. The distributed metadata repository can be operable in indexing event data within the enterprise. Items within the metadata repository may include publishable event definitions for common event definitions across the enterprise, data source definitions to indicate what information is available where in the enterprise network, and security access lists for restricting query access based on security features of the LE system. In one embodiment, such a rendezvous point is accessible through a web-service or enterprise service interface. The web service interface enables users to draft their own event definitions and search for one or more desired system-level event definitions, enables user or applications to use a standard interface to create event execution nodes based on a description of the desired event and the subsequent response actions, and enables users or applications to enrich event detection by asking queries through the web-service interface. The queries access information from multiple data sources throughout the enterprise, and return a response that would appear as if it were from a single unified data source. In one embodiment, the rendezvous point is centralized rather than distributed.

As a general description of the Eventing System or LE system described herein, the eventing system automates processes for finding and extracting data within an enterprise that is relevant for particular individuals and/or particular actions. Such a system permits scaling to large numbers of servers and locations in a parallel execution, and with consistent definition of events across the enterprise. The LE system also enables real-time push of information to users, as contrasted to data cache/pull solutions that are in common use. Thus, the LE system pulls in key information from the data sources and pushes it to consumers. Traditional systems store all information into a central repository that is then queried. In contrast, the LE system pushes the query to data sources ratehr than pulling the data to a repository.

The systems and databases within an enterprise need to be searched and the data extracted to provide a response to a query. Current implementation of the searching and extracting involves the use of data warehousing, building and maintaining of the data within the warehouses and the interfaces to the warehouses, tools to perform queries, etc. A review of some systems in use by companies reveals that the cost of a query may be six man-years of work, estimated at more than $1M at current rates, and all just to report on 30 questions ($55K per question) regarding the events within an enterprise. By contrast, implementation of the presently described eventing-system has been simulated to process the same query and generate the same report in just three man-weeks, resulting in a huge cost savings, and providing a greatly improved ability to act on operational data within the enterprise. The savings in time and money from the distributing of the query components (which may also be referred to as query fragments), sending the query to the source, and the operating on real-time event data is significant.

The LE system described herein enables companies to turn their underlying systems into exception-based process management platforms that enable staff to manage exceptions, rather than to micro-manage steady-state processes. Examples of exception-based process management platforms may include elements such as: escalation policies to ensure corrective action is being taken, incorporation of resolution advice or workflow (such as expediting options and policies for late shipments), performance trending, and root cause analysis of disruptions and lead time fluctuations. The skilled reader will understand that many other examples are possible.

From one perspective, the LE eventing system as described herein could be considered to operate as a similar model as the Internet searches—where the Internet has may nodes, each with data, and indices exist to route queries for particular data types, or data that might match certain criteria. However, the Internet nodes employ IP (Internet Protocol) addresses, which contain no information regarding the content. The addresses simply indicate a location, without indicating what information is at the address. In contrast, the LE system as described herein can use descriptive names or identifiers that indicate the contents of data. The LE system can then index the descriptive name information, which enables the system to determine location and content. The LE system routes queries by correlating the descriptive name information (content and location) to queries, which indicates the relevant locations for relevant content.

As mentioned above, the LE system pushes queries out to the data sources. In one embodiment, queries or query components are not sent all the way to the data source (e.g., the system where the underlying objects are stored and modified) . Rather, the queries can be handled by logic that interfaces directly with the source, for example. Thus, reference to sending out queries, and sending the queries to the source can be understood as sending queries toward the sources, which queries may be answered by the source or an intermediary that has the information to answer the query. The LE system can operate locally near or at the data sources, and find the data very quickly. When the LE system finds the information a user is looking for (e.g., a particular event), the system pushes the information to the user. Additionally, as mentioned above, the LE system can monitor the event data, and detect when a particular event or series of events or conditions takes place. When detected, the LE system can clip and push the information to the user who queried for the particular event, series of events, or conditions.

In one embodiment, the LE system employs global and local schema definitions, as well as transformation definitions to define the data relationships between the local and the global data schemas. A local schema can be understood as a standard or formatting used locally at a system to reference data. A global schema is a standard or formatting that is applicable to a management system that operates across the enterprise. The transformation or translation definitions provide a mapping of the local schema to the global schema. The transformation definitions may be implemented in the form of a lookup table, rules, or other logic. Consider the following tables:

TABLE 1

Global Schema

| Last_Name | First_Name | Cust_ID |
|---|---|---|
| Jacob | Harry | 1001 |
| Williams | Sally | 1902 |
| Smith | Bobby | 2098 |
| Thompson | Bill | 1020 |
| Ford | William | 2031 |
| Donner | Harriett | 2087 |
| Smith | Theresa | 1065 |

TABLE 2

Local Schema - Location 1

| LastName | FirstName | CustomerID |
|---|---|---|
| Jacob | Harry | 01001 |
| Williams | Sally | 01902 |
| Thompson | Bill | 01020 |
| Smith | Theresa | 01065 |

TABLE 3

Local Schema - Location 2

| LName | FName | CustID |
|---|---|---|
| Williams | Sally | 0-2001 |
| Smith | Bobby | 0-2098 |
| Ford | William | 0-2031 |
| Donner | Harriett | 0-2087 |

The global schema represents a central data view of all of the back-end integrated data. Thus, when users access a product, the view is provided via the global schema, and will not provide visibility to the underlying event source. Table 1 provides a simple example of a global schema with three fields: a last name, first name, and customer ID. The fields are labeled as Last_Name, First_Name, and Cust_ID, respectively, in Table 1. The example is mapped to two local schemas (Location 1 as per Table 2, and Location 2 as per Table 3) in two different event sources. The global schema view would contain the superset of the data in the other tables.

Note the difference in representation of the fields in the tables. Table 2 designates the fields as LastName, FirstName, and CustomerID, respectively, while Table 3 designates the fields as LName, FName, and CustID, respectively. The mappings and transformations allow the system to intelligently reconcile different representations of data through a single reconciled view via the global schema. In one implementation, the local data owners are generally responsible for mapping the local data schema to the global schema, allowing the local data owners more control over the mappings and data access.

Returning to the LE system, in one embodiment, the system supports complex event processing (CEP). In CEP, simple events can be aggregated to form multiple, higher-level "complex" (or derived) events. When abstracting from these derived events, the system provides clearly defined problems or opportunities. In CEP, events have the same relationship to one another as the activities they represent. Such correlation is a fundamental aspect of the services provided by CEP systems: events can be related to each other independently of their process context, which provides a powerful means to define services based on system-wide observations. CEP introduces a new dimension through interrelating events originated at different processes, which themselves can be spread across enterprise boundaries.

In CEP, events are processed by means of event patterns, rules, and constraints. An event pattern is a template that matches certain sets of events. In one embodiment, the template or event pattern describes not only the events but also their causal dependencies, timing, data parameters, and context. Examples may include: "All orders from customer C in the last month", "All orders from frequent customers in the last month", etc. An event pattern rule is a reactive rule that specifies an action to be taken whenever an event pattern is matched. A reactive rule has two parts: a trigger, which is an event pattern, and an action, which is an event that is created whenever the trigger matches. A constraint expresses a condition that must be satisfied by the events observed in a system. Constraints can be used to specify not only how a target system should behave, but also how its users should use it. When a pattern is detected, the rule is triggered, and the user (human or automated) can take actions in response.

CEP can be implemented as a logical component separate from the LE system, and may be implemented by a streaming event correlation engine, such as CORAL8, STREAMBASE, or others. The CEP component consists of a rules engine that interprets the event patterns rules and constraints expressed in a corresponding event pattern language (e.g., such as a declarative language for writing patterns of events within an enterprise system). In one embodiment, an event falls in one of the two categories: process event, or structural change events. process events refer to process events originated from a component that is part of a process. Structural change events may be referred to as "meta-events," issued by the CEP component to trigger structural changes in the management of processes.

In one embodiment, each event is self-contained, which refers to an event that has all data and mechanisms present to enable systems to fully comprehend the event for what it stands for. The self-contained representation of events enables interoperability between various event producers, brokers, and consumers in a de-coupled architecture. Thus, an event consumer can handle a particular kind of event irrespective of its origin.

In one embodiment, an event as described herein has three aspects: a form, a significance, and a relationship. The form of an event is an object, which may have particular attributes, and data components (e.g. message string, time stamps, descriptive text, etc.). The significance is the activity that the event signifies. The activity is related to other activities by time, causality, and aggregation. Thus, the relationship indicates how the activities are related.

events can take any of a number of different forms. Examples of event types include, but are not limited to: news feeds on the over a network, email exchanges, information about the physical world from a sensor (e.g., an RFID (radio frequency identifier)), RSS (really simple syndication) feeds sent over the Web (e.g., latest prices at a competitor's online store), changes or incidents in the IT (information technology) infrastructure, inventory levels falling below certain thresholds, shipping order requests, shipment confirmations, shipping order cancellation requests, shipment receipt notifications, invoice notifications, etc. All the examples are assumed to occur within specific processes. Thus, the events described are events within the context of a process.

In the context of execution of a process, an event can be defined as a meaningful change in the state of a object. An event can be delivered along with its context (e.g., additional information from relevant objects such as related objects) making it possible to take further actions by invoking tasks. In one embodiment, an event is logically self-contained in representing all the information pertinent to the situation causing the event. The event could directly contain all the relevant details or provide links to the relevant details. Note that the self-contained aspect of an event does not rule out the need for accessing additional data, rules, etc., for the purposes of processing and acting upon the event. Thus, in one embodiment, other data and/or rules are accessed in addition to receiving a response query to enable action on the event.

The eventing system as described herein may be considered to have design-time and runtime aspects. In the design-time, query patterns may be selected, indexing of the system can be configured, and the data sources enabled to generate data streams. The LE nodes are thus enabled to locate information, and establish subscriptions with the data sources at runtime. At runtime, a complex event processing (CEP) rules engine can trigger events as the result of a positive pattern match. In one embodiment, the CEP engine executes as a separate process in parallel to a "worker" processes, or event execution node (EN) that implements the logic of the events.

In one embodiment, the ENs essentially have two parts: an event correlation module that interfaces with the underlying CEP, and actions that are implemented as processes. The event correlation module may inform the CEP of the event stream(s) to which it needs to subscribe and the EN will pass to the CEP the event correlation pattern that it wants to detect. In one embodiment, the EN sleeps or idles while it waits for the CEP to detect the event defined by the event pattern. When the CEP detects the specific event pattern, it will wake up the EN and pass the high-level event data that was detected to the EN. When the EN is awake, it executes an action procedure associated with the event pattern.

The action procedure may trigger one or more of the following, which is not meant to be an exclusive list of possible actions: 1) enrich the event data with additional information/data to make the event actionable (the associated data that comes with the event data may not be sufficient to make the event actionable). The procedure may use a database connection to, for example, a federated database engine to access data from one or multiple distributed sources through a single unified interface and data organization; 2) directly trigger another action, such as by directly connecting to a backend server (e.g., mySAP ERP) to cause an action to take place. The other action may simply change the value of a data item within the server or it may cause a corresponding process to execute; 3) publish one or more new events, such as generating one or more streams of data. In one embodiment, such data streams are in the form of XML messages. Various adapters are available to redirect these streams to a user in a selected channel. The adapters may allow redirection via: email (a message sent as email to one or more specific recipients), RSS (a feed can be produced and delivered pertinent information and links to the laptop, desktop, or any mobile device via a simple RSS Reader to which the user can subscribe), computer dialog (a message can be sent to the user's display in any of a number of manners, such as a bar at the top of the user's screen that could display alerts/messages as they arrive, a web browser, or a MICROSOFT OFFICE task pane (integrated with SAP through DUET)), or SMS to mobile phone (a message can be sent to a specific user's cell phone).

In one embodiment, the publish and subscribe mechanisms mentioned above work in conjunction with indexing and network routing index mechanisms within the LE system. The indexing mechanisms provide a system for intelligent routing of events across the enterprise network, not through the use of IP addresses, but through data services and indexing queries via a network routing index. The publish and subscribe architecture can be employed by the data sources and routing nodes within the LE system, including a descriptive, dynamic destination system using naming. In one embodiment, the naming uses parallel address space. Events and data information extracted from databases inside a particular enterprise can be transformed messages, which can then be routed to destinations having descriptive names—the names descriptive of the information sought in the queries. These messages can be in a format that is self-describing, user and machine reabable. For example formats specified in XML. Depending on the system configuration, millions of arbitrary dynamic names may be permitted per node. For the receiving end, the LE nodes can transform XML messages to a local format of the recipient.

Such naming and indexing can express the arbitrary mixed information content at a location in the smallest form possible, and permit the system to coordinate continuous additions and deletions across thousands of locations without a central coordinator, and without over-flowing index memory. Thus, a data source can be indexed and the enterprise network (via the LE system) can understand that a particular data source contains content/information, for example, an answer to a query for where to order "blue shirts," or sales data on blue shirts sold, or any other data element.

As discussed above, the LE system uses equations to generate and interpret bit vectors in indexing. The use of the bit vectors has the potential to generate false positives, and thus increase network traffic by routing queries to locations that do not contain information sought. False negatives are less desirable, which may justify increases in network traffic. In one embodiment, the LE system can have different sized bit vectors, or the bit vectors may all be the same size. The difference in bit vector size can be leveraged to route based on a tolerance for a query. Thus, a larger, more accurate (but slower) bit vector can be used when precision is desired, and a smaller faster bit vector can be used when the query results can tolerate less accuracy. In one embodiment, the LE system is a two-stage system having bit rates at the edges of the network smaller than bit rates at the network core nodes. For example, a bit rate corresponding to a 15% false positive rate may be desired for routing in the core. The internal network routing may be performed with a smaller, faster bit rate that has a 15% false positive rate, whereas a larger bit rate may be used at the edge (near the actual data sources) that has a lower (e.g., 1%) false positive rate. That way, queries will be more likely to be routed to data sources with information, but the data sources will be filtered from receiving too many queries. The indexing can thus act as a filter to minimize network traffic, and thus minimize the intelligence needed at the data source.

Note that in traditional systems, data is archived, or stored in data warehouses, which is typically placed in tables. However, the real-time data (event data) is not in table in a database. For example, in an inventory event, the event name may be "order received," with fields indicating RFID number, product SKU, customer name, product name, and possibly values, etc. The system can be configured to index parts of the whole, such as SKU name, event name, RFID, and value, while other fields are not indexed. In terms of indexing, the system may index any arbitrary length string.

The strings can be organized, such as ordering the strings by rank, where each field is ranked. The query can thus be for a matching string. In one embodiment, a schema name is provided at APIs (application programming interfaces) of the LE system, providing a sort of programming interface. LE nodes can thus be configured to create the events in the same way each time, as ranked. For example, a string may be: schema name, field name, data in; schema name, field name, data out.

The data source locations and the routing nodes can organize strings in the same way (same internal ordering), which allows for string matching, allowing the use of equations to generate bit vectors. In one embodiment, first, the system obtains a schema name to route on, then looks to data at the data source, and indexes the data according to a global schema. Then, the system may create a bit vector for each data source. The bit vector basically describes all the data located in the data source.

The LE nodes or LE servers receive the bit vectors for each data source at a location, and join the bit vectors together into a single bit vector to represent the entire location. In one embodiment, combining the bits vectors can be a simple matter of ORing them together. In one embodiment, bit vectors may be strung together, and also shrunk, and/or increased in size. Shrinking bit vectors can be performed, for example, by performing a modulo operation. In such a way, for example, 220 million bits of information can be reduced into less than a megabyte. In one embodiment, actual routing of queries may be accomplished using known network protocols, such as OSPF (open shortest path first) or hierarchical shortest path first (HSPF).

When LE nodes have bit vectors built for the data sources of the location at which the LE node is located, and that information is propagated to neighboring nodes, each node in the LE system has enough information to build a routing table. Although there will obviously be some sort of system configuration, the LE system can operate dynamically, making it scalable. The information at each node can be indexed and shared periodically, or relatively continuously. Updates can affect the information at a node, which can then indicate the change to its neighbors. Each node can be brought on one at a time. For example, a single department can be started, and then the LE system grown by bringing up additional departments. More and more information will go into a summary bit vector as the LE system grows. And as the enterprise network changes, the path for data can simply be recalculated.

Note also that routing as described with the indexing enables a fault-tolerant network. Problems on the network may be avoidable by simply routing around the problem.

Figure 2:
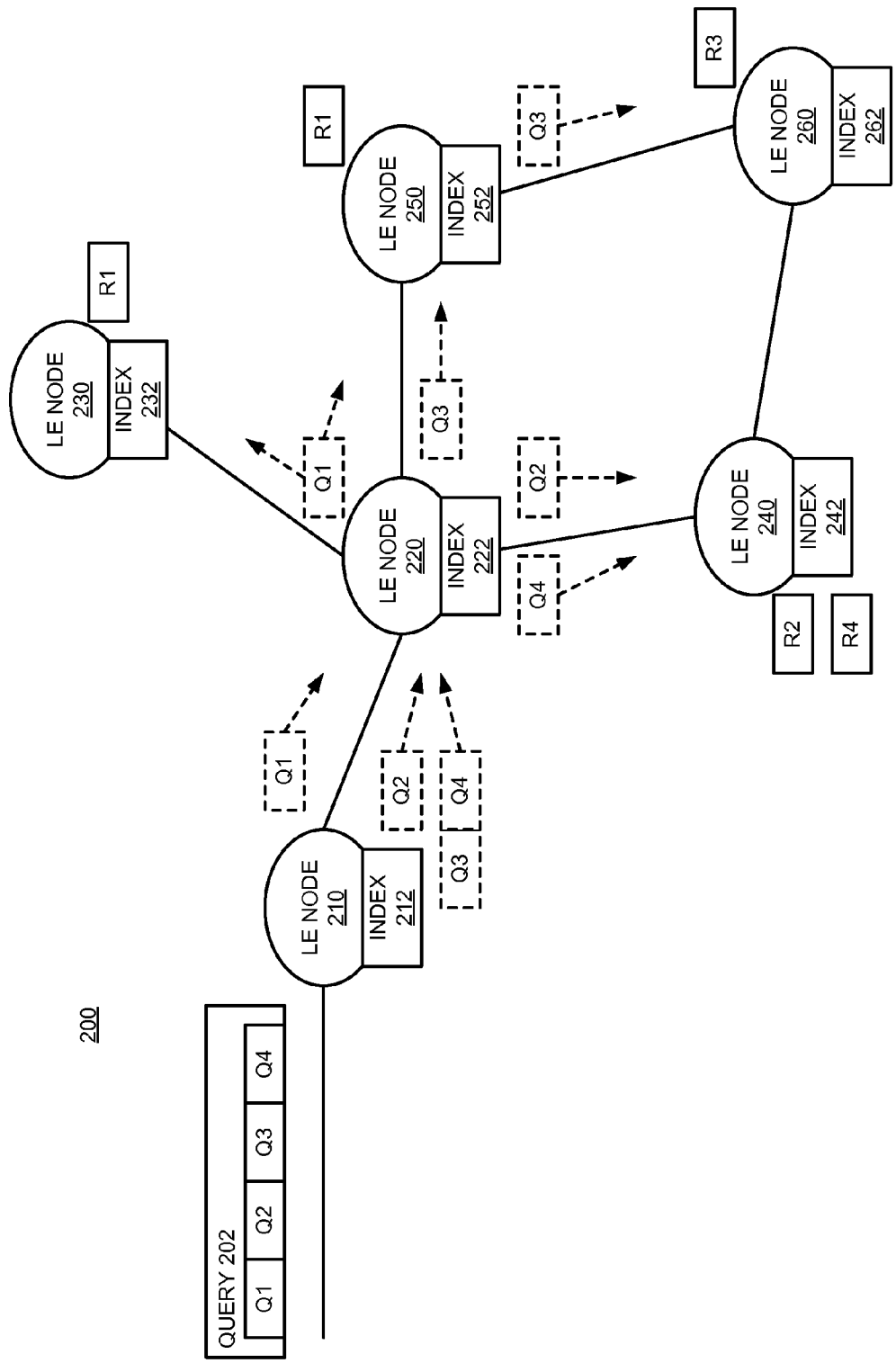
FIG. 2 is a block diagram of an embodiment of an enterprise system that separates event queries into component parts and routes based on indices.

FIG. 2 is a block diagram of an embodiment of an enterprise system that separates event queries into components or component parts and routes based on indices. System 200 is an eventing system or an LE system according to any embodiment described herein. System 200 includes various LE nodes, 210, 220, 230, 240, 250, and 260, each of which may have zero or more associated data source subsystems (not shown). For purposes of description, assume that certain nodes are proximate to the data source for certain information. Being proximate to the data source refers to the node being the closest query processing element to data source (which may be the data source itself). As illustrated, the query response components are designated R1, R2, R3, and R4, referring to respective responses for query segments Q1, Q2, Q3, and Q4. The responses components R1, R2, R3, and R4 represent event data that can be returned as data objects, actionable content, or some other form. The separate response components can then be selectively combined or joined to form a complete response.

Query 202 includes query segments or query components Q1, Q2, Q3, and Q4. LE node 210 is the access node for the user that generates query 202. Thus, node 210 receives the query for LE system 200, and parses the query into components Q1, Q3, and Q2+Q4. LE node 220 may receive the queries and route them to the data sources, based on descriptive name identifiers that indicate location and content of the data. Thus, Q1 is routed to LE node 230 and LE node 250, which both have response components R1. LE node 240 includes data (represented by R2 and R4) to respond to Q2 and Q4, and thus, Q2 and Q4 are routed to LE node 240. To receive a response to Q3, LE node 220 needs to route the query component to LE node 250, which has data R3. As illustrated in FIG. 2, LE node 220 can route Q2 either through LE node 250 or LE node 240. In actual implementations of systems, there may be similar situations where a query can be routed in one of multiple ways to a data source. In the illustrated example, LE node 220 routes the query through LE node 250. In one embodiment, the selection of routing through LE node 250 is random, and there may not be any clear choice of one route over the other. However, design choices could be made, based for example, on traffic, on a type of connection (e.g., secure, protocol type, etc.), for purposes of combining the query with another query generated at LE node 250 for data R3, or because LE node 250 is listed before LE node 240 on a list of potential next hops in a routing table, or some other reason. Thus, routing can be conscious of the traffic load. For example, perhaps the link between LE node 220 and LE node 240 has more traffic than the link to LE node 250. In another example, perhaps another query Q3 (not shown) is also at LE node 250; in such a case, Q3 from query 202 can be combined or joined with the other Q3 query to make a single query on LE node 260, and R3 is duplicated at LE node 250, which could send R3 to respond to query 202, and to another query source (not shown).

In one embodiment, LE node 210 breaks query 202 into components Q1, Q3, and Q2+Q4—meaning query 202 is only parsed three ways at LE node 210. The parsing and routing can be iterative within system 200. Consider that an additional LE node (not shown) is connected to LE node 240, which has data R2, while data R4 is generated at LE node 240. Thus, LE node 210 could parse the query as shown, and LE node 220 as shown (or alternatively, LE node 240) could further parse the query Q2+Q4 into separate queries Q2 and Q4. This figure is intended to show and describe the breaking down of the queries into components. The query is shown with various sub-elements, which get separated and sent to the next node, which then further separates components 3 and 4. The concept of sending a component to multiple nodes is shown with Q1, and the concept that multiple components may be sent to the same node is shown by node 240.

Thus, LE system 200 can parse queries in any number of ways, and the system can iteratively parse queries into separate components. Additionally, system 200 is intelligent enough to combine query components (e.g., the example given above about an additional query Q3 at LE node 250), and to duplicate queries (sending Q1 to both LE node 230 and LE node 250). The responses are all combined as returned to provide the desired information. In the case where a query was duplicated, such as with Q1, the separate responses, R1a and R1b are combined for a response R1 with all the information from both data sources.

Each of LE nodes 210, 220, 230, 240, 250, and 260 includes an associated index 212, 222, 232, 242, 252, and 262, respectively. The indices include routing information to determine, for example, how to send query components of query 202 to the various data sources. In one embodiment, each index has bit vectors of data sources at its own location (e.g., R1 for LE node 230), as well as all its neighbors (e.g., LE node 230 may include index information from LE node 220). The index information enables each LE node to generate routing tables to determine how to route the queries. In one embodiment, the different indices use different bit vector sizes, depending on their location with a network. If system 200 is considered to be a complete picture of a simplified network, perhaps LE nodes 220, 240, and 250 would be considered "core" nodes, and all other nodes would be considered edge nodes. Thus, indices 222, 242, and 252 may have shorter bit vectors that are less precise than the bit vectors of the other nodes, but which route data more quickly. The filtering of the data can be handled at the edge to prevent false positives in queries.

As discussed above, there is an assumption of knowledge between the nodes for system 200 to operate in the manner described. In one embodiment, system 200 configures itself automatically. For example, system 200 could automate the following: discovering the nearest nodes, registering with those nodes, registering publishable events, and connecting to subscribed event streams. The indices and associated routing tables can be built from such information. In such a manner, each node is able to access real-time data from other nodes. Other manners of configuration and accessing real-time data are possible. The nodes could push (e.g., broadcast) data to its neighbor nodes, which could then request specific data. Automated discovery can be accomplished with a local network discovery, where an expanding ring search is employed using publish-and-subscribe. In one embodiment, a discovery could be performed by a discovery request having an initial TTL (time to live) of one hop. If a node with routing information exists within the one hop, the receiving node receives the request and responds with its IP address and port number. The requesting node can then connect directly to the responding node with TCP and register its publishable events. If a node with routing information does not exist within one routing hop away, no response is sent. After time out (recall the one-hop TTL), the node can send out a discovery request with a two-hop TTL, and repeat the sequence.

Wide-area network discovery can employ a seeded approach, where a node is configured with an IP address of a primary node with routing information. The node can then connect, for example, using SOAP (simple object access protocol), or another HTTP-based (hypertext transfer protocol) RPC (remote procedure call) protocol. After the initial connection, a similar registration procedure as described above can commence.

Figure 3:
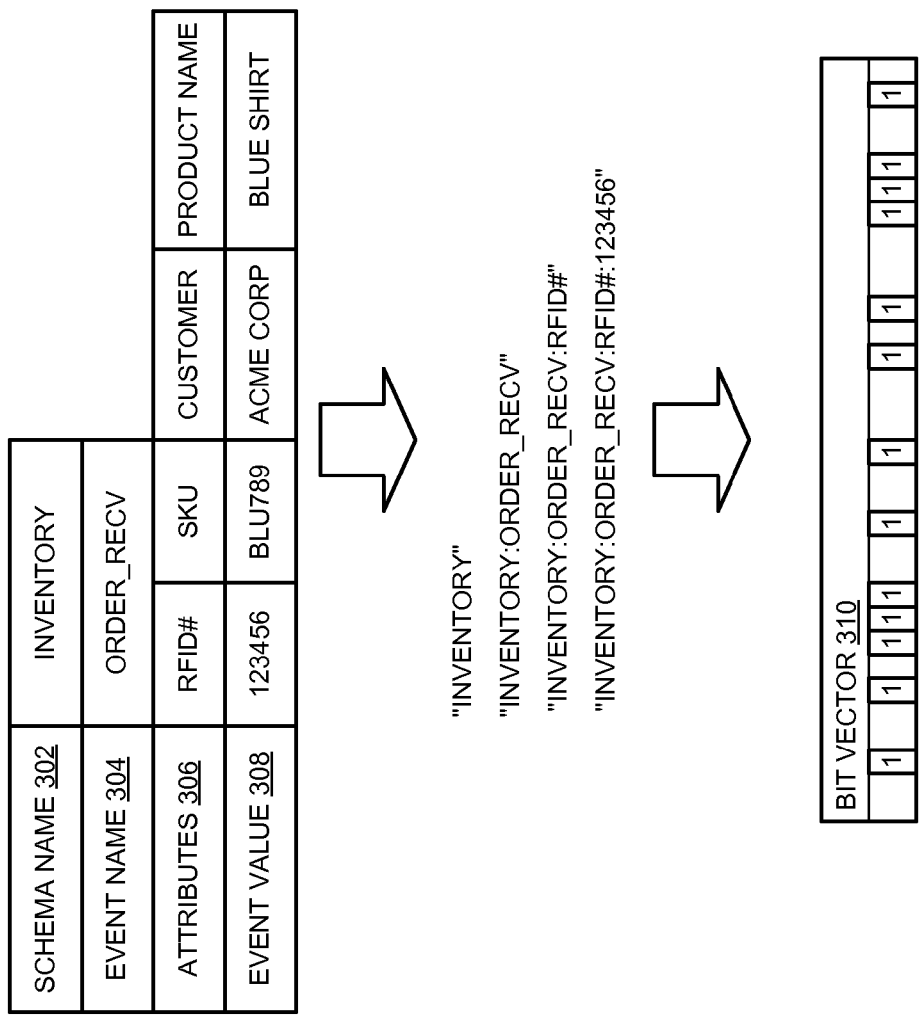
FIG. 3 is a block diagram of an embodiment of a descriptive identifier.

FIG. 3 is a block diagram of an embodiment of a descriptive identifier. Schema name 302 identifies a particular schema or naming convention within the LE system. Based on schema 302, the identity and order of fields for a descriptive identifier may be set within the LE system. For example, for schema "inventory," there may be an event name 304 ("order recv"), as well as an RFID number listed in attributes 306. Each attribute 306 has a corresponding event value 308, which in the case of RFID number is '123456'. Observe that there may be more attributes 306 than are selected for indexing. SKU 'BLU789', Customer 'ACME Corp', and product name 'blue shirt' may be part of the information about an event, but not be selected for indexing. Each attribute 306 can be an item of data that may be queried within the enterprise system. Each attribute 306 may be event data or data related to an event in the system.

Thus, the descriptive name identifier may be generated by generating the string 'inventory:order_recv:rfid#:123456'. In other examples, more or fewer fields can be used in a descriptive name identifier. In the generated string, 'inventory' is the general schema, which may be a general data type of information or event data sought. The field 'order_recv' may indicate a business activity that is used as a parameter for an event within the system (e.g., receiving an order). The fields 'rfid#' and '123456' can further identify specific fields of event information that will be used to compose event information and/or take action on an event.

The descriptive name identifier string can then be changed into bit vector 310, which can be considered to be a descriptive name identifier for the purposes of description. Bit vector 310 is a descriptive name identifier in that the bit sequence identifies content and location of event data. Bit vector 310 may be understandable within the LE system through the use of equations that can identify the information stored within bit vector 310.

In one embodiment, the descriptive name identifier can be generated from the string as follows. The string is an arbitrary string 'A'. String 'A' is hashed using MD5, which is a known hashing function that always produces a 128 bit hash from an arbitrary string. The result of the hash is 128 bit result 'B'. Represented mathematically, B=MD5(A). With a single hash of A, there is still a significant risk of producing a false positive. Thus, in one embodiment, four hashing functions are used to drop the false positive error rate significantly, while not overly increasing the required bit vector length. Thus, B can be divided into four separate bit vectors, b1, b2, b3, and b4, each of which is 32 bits. Each of the sub sub-elements can be used as addresses in a bit vector modulo the size of the bit vector, which points can then be set to 1. The process is described in more detail below with reference to FIG. 4.

Figure 4:
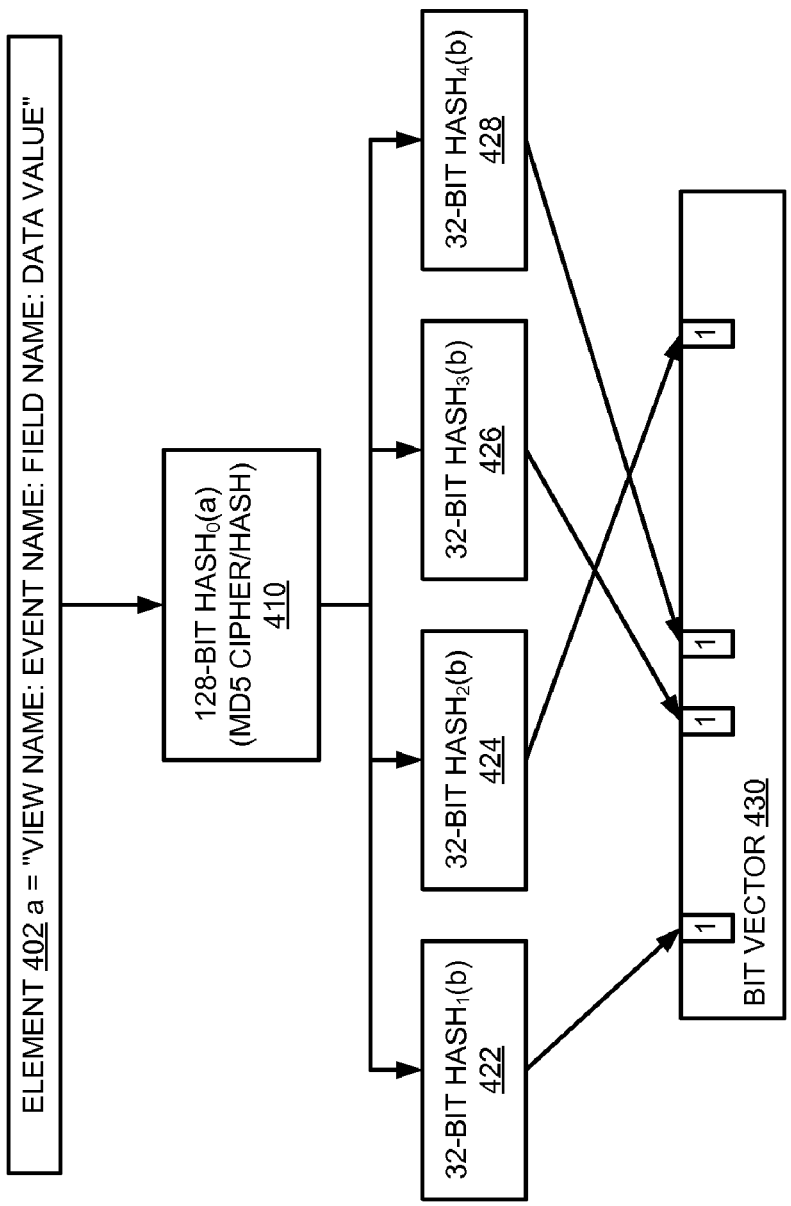
FIG. 4 is a block diagram of an embodiment of a representation of assigning a bit vector to a string that represents information for event data.

FIG. 4 is a block diagram of an embodiment of a representation of assigning a bit vector to a string that represents information for event data. Element 402 represents an element of information that might be available from a data source, as described herein. In one embodiment, element 402 has a form of 'a=view name: event name:field name:data value,' although it will be understood that other forms may be used, including having more or fewer fields of information. It will be understood that 'a' represents the string, and operations shown elsewhere in FIG. 4 are shown to operate on string 'a'. Element 402 is merely one example of a formatting or organization of certain information that provides index values. Other information may be used in addition to, or in place of, what is illustrated.

Element 402 may include arbitrarily-selected data, as explained above, and may be an arbitrary length string. In one embodiment, element 402 is processed with a 128-bit hash (referred to as $HASH_0(a)$), 410. The 128-bit hash may be, for example, an MD5 cipher/hash. It will be understood that the length of the hash is selected based on system configuration, and any value could be used. Through experimentation, it has been found that a 128-bit hash whose output is split into 32-bit hashes provides good operability, with reduced collisions. Thus, 32-bit hashes 422, 424, 426, and 428 (referred to, respectively, as $b_1$, $b_2$, $b_3$, and $b_4$, where '$b_j$' are substrings of the result of hash 410). The substring $b_1$ is the first 32 bits of b; $b_2$ is the second 32 bits of b; and so on. The 32-bit hashes $b_1$, $b_2$, $b_3$, and $b_4$, are used to set the non-zero bits of a bit vector. The entire process results in a constant size bit vector with information content.

The entire process results in a constant size bit vector with information content. The vector size was determined by using bit-vector probabilities to choose 5 differently-sized hash functions for experimentation, and then by analyzing the performance of the resultant 5 hash functions. The best performance was found with the 32-bit sized hash function on scales of bits per entry versus error rate, and a combination of the four 32-bit sized hash functions was determined to have the best number of hash functions versus false positive rate.

Thus, in one embodiment, as illustrated in FIG. 4, the LE system takes any arbitrary length string and hashes it, regardless of string content. Four additional hashes are performed, which set the bit positions of bit vector 430. The bit vector as a whole indicates what information content is at a particular network location.

Figure 5:
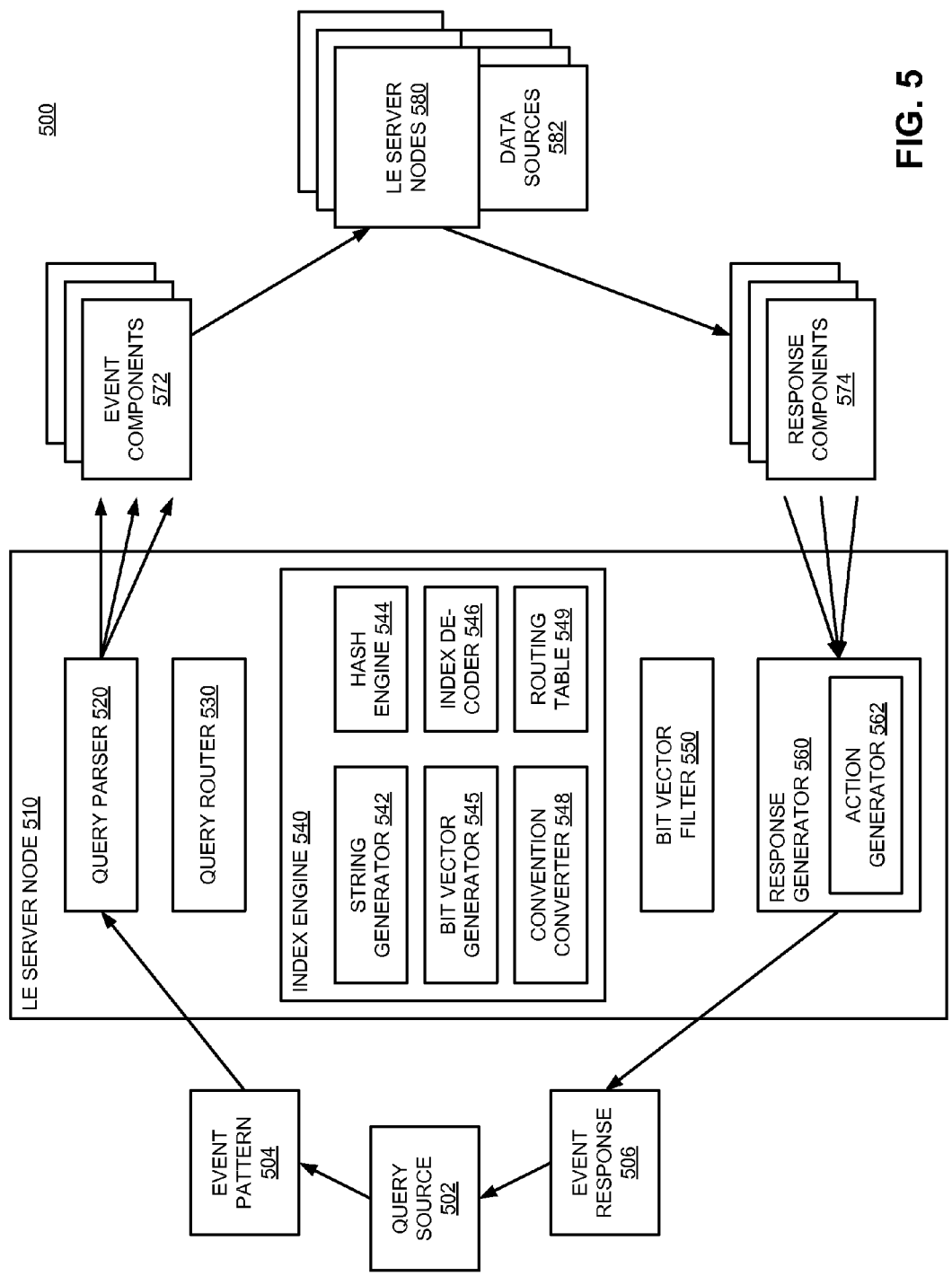
FIG. 5 is a block diagram of an embodiment of a network node having an indexing engine for indexing and routing queries based on descriptive name identifiers.

FIG. 5 is a block diagram of an embodiment of a network node having an indexing engine for indexing and routing queries based on descriptive name identifiers. System 500 includes query source 502, which represents a human or electronic user that generates a query for event data. System 502 is an example of any embodiment of an LE system as described herein. Note that a query may refer to a question or a request for information that is generated and then immediately sent to search for information. Alternatively, a query may be a pattern of events or conditions within the enterprise network that a user wants to be apprised of. Both types of queries are supported in the eventing system described herein. However, the simple type should be understood based on the description above, and the discussion here will focus more on the pattern of events.

The event pattern query type may be considered a monitoring query, in that a "query" is generated, and the system "waits" for data that answers the query. Such a system may also be referred to as an exception-based system, waiting for a pattern to be matched (an exception), rather than being informed of every detail of the system's operation. In the event data system, a pattern is generated, which indicates or defines a number of conditions or event that should be present for the pattern to be matched. The logic of the pattern is not limited to a simple list; rather, rules could be defined that indicate dependencies on conditions (e.g., a condition may only exist if two conditions are true, or only if one condition occurs before another). Event pattern 504 represents the query or pattern of event data as described. Event components 562 may represent individual queries that are sent, and/or they could represent data stream subscriptions.

Query source 502 sends the query (event pattern 504) to LE server node 510. In one embodiment, LE server node 510 stores event pattern 504, and responds when the pattern is matched with enterprise event data. LE server node 510 matches event pattern to real-time event data by querying data sources 582. As referred to herein, "matching" data refers to data that has a format and/or content related to a rule or a condition of a query. Query parser 520 represents logic that breaks event pattern 504 into its component elements, and each component can be queried separately, and separately matched. Query parser 520 may operate in conjunction with query router 530, index engine 540, and bit vector filter 550, which are all described in more detail below.

Event components 572 represent the one or more query components or query segments, or subscriptions to streams that provide data about such segments, of event pattern 504 that LE server node 510 sends through the enterprise network. LE server nodes 580 represent other nodes in the enterprise network, and will be interconnected as configured within the enterprise. It should be expected that while some configurations may overlap to some extent among enterprises, the configuration will largely be custom for each enterprise. LE server nodes 580 enable access to data sources 582, with LE server nodes having zero or more associated data sources 582. The queries are processed as close to the data source as possible within the enterprise configuration. Some enterprises may be configured to have each data source receive and process queries. Others may have the associated server node process and respond to the queries. In one embodiment, the event data is available from the data source in the form of a data stream or data feed. Such streams or feeds may work by the data source sending updates periodically or as they occur.

The data can be sent, for example, to the associated server node, which can then respond to queries with real-time data.

In one embodiment, the queries are responded to individually, and response components 574 represent the separate responses to each individual event component 572. LE server node 510 includes response generator 560, which receives the response components 574, and generates a complete response or event that answers the query of event pattern 504. Event response 506 represents such an event. In one embodiment, event response 506 is an actionable data object. In one embodiment, actions that can be performed on the data object are generated or compiled (e.g., from available components within the enterprise) by action generator 562. Actions include operations that can be performed in response to the conditions of event pattern 502. In one embodiment, an action may include launching a process of the enterprise system.

Query router 530 enables LE server node 510 to route query components to data sources, and selectively combine query components to perform stream sharing. Stream sharing refers to the ability of LE server node 510 to reduce bandwidth by sharing combining event components 572 with other queries for the same components. The "stream" may be initiated and managed by the server node itself, apart from any other component in the enterprise network. Alternatively, other server nodes may cooperatively stream. Matching query elements can be "combined" by one of the nodes sending the query to the source, and then splitting out the response. In one embodiment, LE server node 510 includes a "join table," (not shown) which refers to a table or data structure that indicates an LE server that subscribes to a particular event data feed. Different LE servers may subscribe to different feeds, and not all LE servers will necessarily subscribe to all feeds.

In one embodiment, query router 530 includes a security engine (not shown) to selectively route queries and responses based on a security access level of query source 502. For example, queries may be generated that indicate the level of access. Received data may be filtered according to the level of access.

Index engine 540 enables LE server node 510 to provide indexing services on data within the enterprise network, which can be a basis for routing. Index engine 540 may include one or more functional components, which may include any or all of those illustrated, and/or others.

String generator 542 enables LE server node 510 to generate a string having descriptive content to identify event data within an enterprise. The string may be of an arbitrary length. String generator 542 may be enabled by an API with which the system can describe data content. Hash engine 544 enables LE server node 510 to perform hash operations on the generated string. The hash operations are a set of predetermined operations through which a descriptive name is defined. Bit vector generator 545 enables LE server node 510 to generate a bit vector from the hash operations. The hash operations may populate the bit vector, which will then describe where data is located, and indicate information about what the data is. Note that the bit vector may not define event data with precision. That is, the bit vector may not indicate a particular item of data, but rather will indicate where data items of a particular type are located within the network. It may alternatively be said that the bit vectors indicate a next hop from a particular LE node within the enterprise network to access event data of a particular type. Index decoder 546 enables LE server node 510 to operate on bit vectors to determine their meaning Index decoder 546 refers to the equations mentioned above that can indicate location and content of data from the descriptive identifier (in this case, the resulting bit vector). The equations are implementation-specific, and will depend on the hash used and the network architecture, and possibly on other system configuration details. Convention converter 548 enables LE server node 510 to convert a local string convention into a global schema to enable a proper descriptive name identifier that is understandable to other nodes in the enterprise network. In one embodiment, based on the information of its own bit vectors, as well as those of neighboring nodes, LE server node 510 generates routing table 549. Routing table 549 enables query router 530 to route queries.

In one embodiment, LE server node 510 includes bit vector filter 550, which enables LE server node 510 to combine or reduce bit vectors to allow for lower or higher precision in routing. Bit vector filter 550 also indicates the ability of LE server node 510 to receive from (and likewise to pass to) neighboring LE nodes bit vector or index information and assimilate that information. The information from neighboring nodes enables LE server node 510 to determine how to route queries through the enterprise network.

Figure 6:
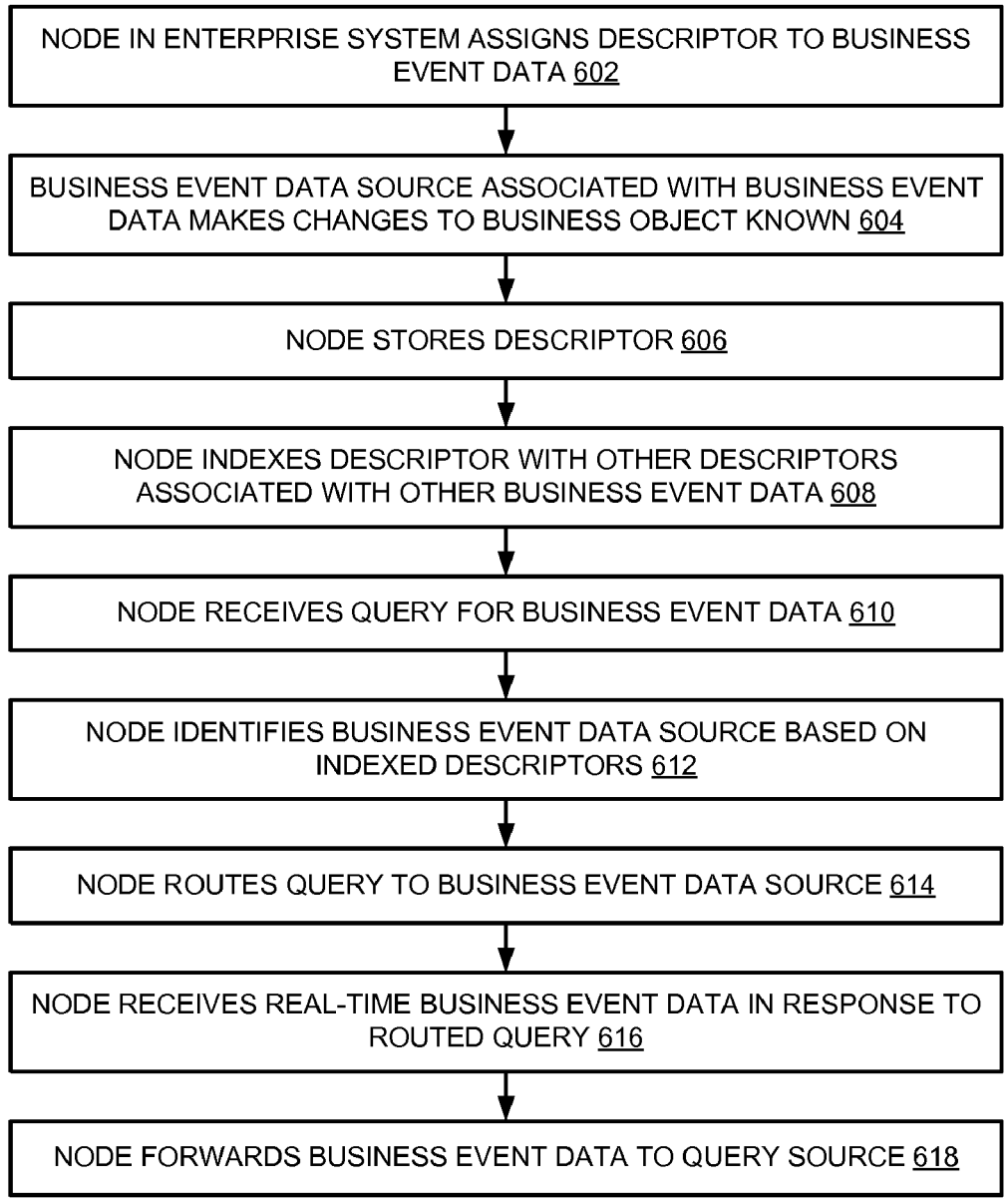
FIG. 6 is a flow diagram of an embodiment of a process for generating and indexing descriptive name identifiers for routing queries to event information sources.

FIG. 6 is a flow diagram of an embodiment of a process for generating and indexing descriptive name identifiers for routing queries to event information sources. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

Operations are described that are performed by a node in an LE system. The LE node can be any embodiment of an LE server node described herein. The node in an enterprise system assigns a descriptor to event data, 602. The descriptor may be the same descriptor used by the source itself of the event data. Alternatively, the descriptor may be a string generated according to a global naming schema for the enterprise network. The descriptor identifies event data associated with a data source. When the data source associated with the event data makes a change to a object, the data source makes the change known, 604. The identification of the change to the object may be event data. The change may be made known, for example, with a publish-subscribe message by sending a message to subscribers of the event data.

The node stores the descriptor associated with the event data, 606, and indexes the descriptor with other descriptors associated with other event data, 608. The indexed information relates to event data local to a location of the node (e.g., data sources located at the same network location as the node). Other information about event data indexed at neighboring nodes may also be stored to provide routing information for queries. At some point, the node receives a query for event data from a query source, 610. The node identifies one or more data sources that may have information to answer the query, based on the indexed information, 612. The indexed information can be compared against a query, for example, by processing the indexed information (e.g., a bit vector or descriptive name identifier) with one or more equations that can indicate what data is where in the enterprise network.

The node routes the query to the data source, 614. The query will be processed as close to the source of the data as possible within the network. The node receives real0time event data in response to routing the query to the data source,

616. The reply event data can then be forwarded back to the query source, 618, or multiple query sources in the event of stream sharing.

Figure 7:
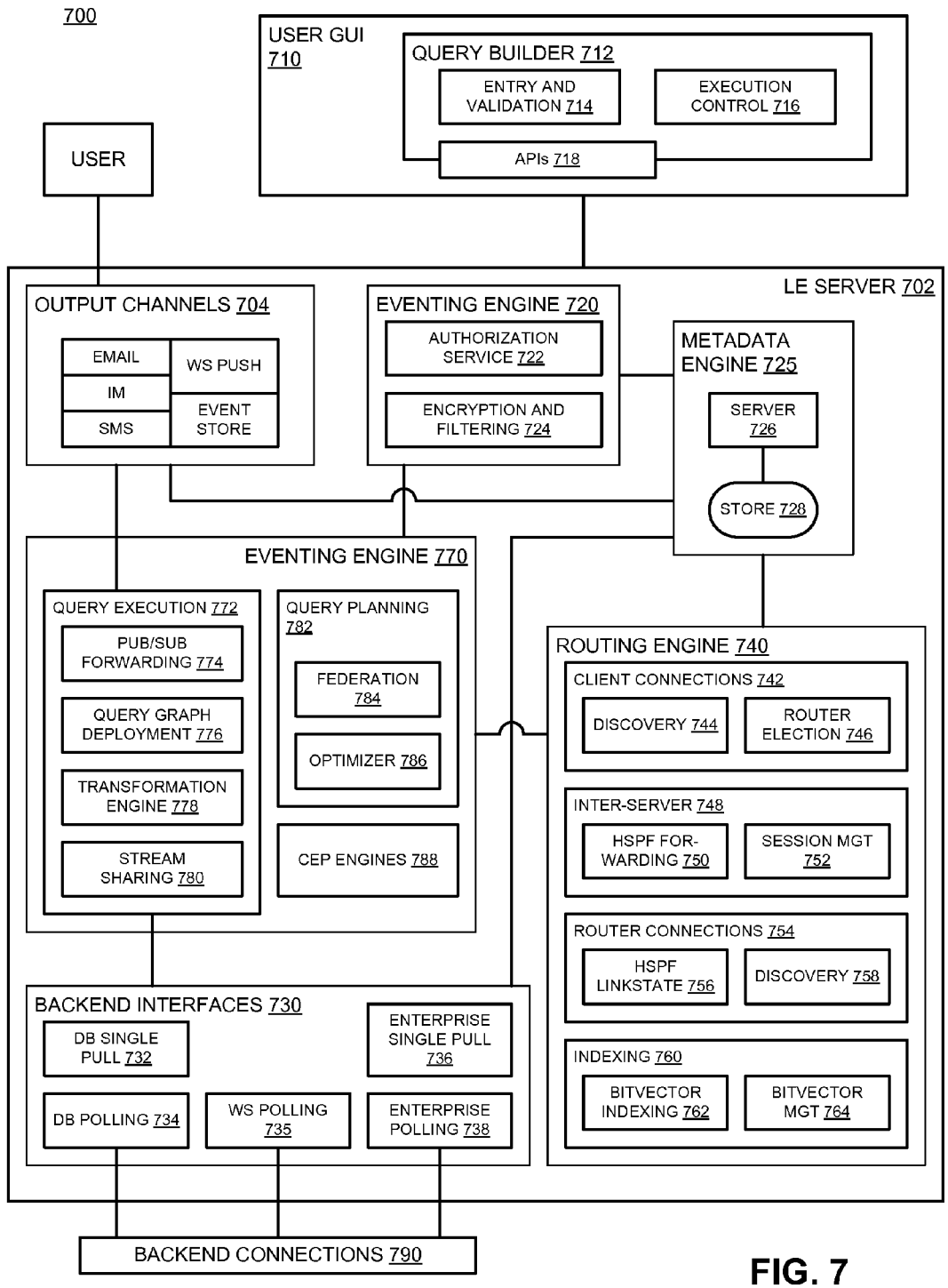
FIG. 7 is a block diagram of an embodiment of a system with an event server.

FIG. 7 is a block diagram of an embodiment of a system with an event server. System 700 represents an enterprise system according to any embodiment described herein. System 700 may include additional details and/or alternative implementations of an LE server and LE system.

System 700 includes user GUI (graphical user interface) 710, which provides a framework to build and send queries. In one embodiment, user GUI 710 is built upon the industry-standard Eclipse GUI Framework based tool for construction, execution, and status tracking of queries. Query builder 712 enables a user to create and validate event queries as well as to monitor event query execution. Entry and validation 714 refers to components that enable the user to provide input. Execution control 716 may set rules on the query and include logic for the query to be sent in the LE system.

System 700 may include multiple APIs (application programming interfaces) that enable a user to interact with LE server 702. APIs 718 represent such interfaces. In one embodiment, two standard interfaces for clients exist: a Java API and a Web Service API. In one embodiment, the web service API can be implemented as a wrapper for the Java API.

LE server 702 may include a number of components, which may include some or all of the following. Additional components could also be included. Security engine 720 can provide security throughout the LE system. In one embodiment, security engine 720 implements a two-level security model, enforcing security at a global LE system level and at a local data source level. At the global level, LE server 702 can authenticate a user and enforce the user's access rights and restrictions down to the row level with authorization service 722 (to determine security access privilege) and encryption and filtering 724 (to enforce the security access). In one embodiment, event queries and their result sets are encrypted with a different key being used on a per query basis.

Metadata engine 725 includes metadata server 726 and metadata store or repository 728. Metadata engine 725 contains run-time and configuration information about the LE system. For instance, as an example of configuration information, metadata engine 725 may have or contain global schema, various local schemas, as well as the various mappings between schema. The schema metadata enables the system to identify similar content even when different naming conventions for data are used. Thus, the data can be indexed for routing based on the schema, and the schema can enable the system to identify what data is available for access. In terms of run-time information, metadata engine 725 can contain user defined event queries to indicate data the user would like to receive. It may also contain LE network topology status information, which provides information for purposes of determining routing by knowing what nodes are available.

Event query manager 770 represents a central hub within LE server 702 for handling eventing data. Event query manager 770 may also be referred to as an eventing engine, and it plans event queries and coordinates the execution of the event queries.

Event query manager 770 includes query execution 772, which implements finalized event query plans. Event query manager 772 may set up the paths down which the event query and results sets will flow. The query plan will be deployed amongst the underlying network adapters that connect to the data sources and other LE servers, the remote LE servers themselves, and CEP (Complex Event Processing) engines 788. If the LE system detects that multiple users who have equivalent access rights are requesting common event data, query execution 772 implements stream sharing to join query execution together.

Query execution 772 includes pub/sub (publish/subscribe) forwarding 774, which represents publish and subscribe mechanisms hosted by LE server 702 and remote LE servers to advertise and pass data throughout the LE system. Note that query topics can be generated on the fly in an ad hoc manner, and all topics can then be accessible through the publish and subscribe mechanism. Thus, for example, query topics do not have to be predefined. Query graph deployment 776 represents a path plan, which can include identifying what nodes are preferred paths for certain query components or query topics, and what nodes are alternate paths. In the case of common queries, one node may receive the common query components and join them. In one embodiment, the LE nodes implement an inter-node communication protocol to determine priorities and establish a query graph. The graph is not necessarily fixed at any given point in time, but can be modified dynamically within the LE system. Transformation engine 778 enables query execution 772 to modify or transform query components to generate queries, and transform responses to generate actionable event data. Stream sharing 780 enables the joining of queries.

Event query manager 770 includes query planning 782. When a client submits an event query for processing, event query manager 770 may first implement an execution plan. The event query is analyzed, optimized, and federated (with components such as federation service 784 and optimizer service 186) into simpler fragments composed of individual raw event types and tables. Such a plan uses the global to local mapping information in metadata engine 725 to determine what transformations need to be performed to generate the queries. Additionally, query planning 782 may access index information within indexing 758 of routing engine 740 to determine whether the event query (or fragments, query components) are to be executed remotely at other LE servers.

In one embodiment, all event queries are executed in a publish-and-subscribe manner and event query manager 770 acts as a hub for information flowing between the network adapters 730, CEP engines 788, and remote LE servers. If event information comes from a network adapter, the event information is transformed from the data source's local schema to the normalized global schema for use at LE server 702. In one embodiment, the event query will be executed continuously until the user specifically unsubscribes.

Event query manager 770 processes an event query, and may be able to handle the query locally at the data source or sources local to the LE server. A local data source is one that is addressable directly using a local schema. In one embodiment, a local data source is directly coupled to the LE server. In the case of data from remote LE servers, the query processing may be referred to as federated event query processing. With federated processing, the LE server may use an event federation grid to achieve fast performance. Such a grid can assume that the data sources will be distributed in a disjointed manner between several LE servers. The LE servers may or may not be in different geographic locations. Once the user defines the specific complex event pattern for the event desired, the LE server receiving the query analyzes the event and attempts to break it up into smaller and simpler pattern fragments. If more than one data source applies to an event pattern fragment, then copies of that fragment are sent to all LE servers that are connected to the applicable data sources and executed in parallel. Note that this process may be recursive. Event pattern fragments themselves may be broken up into even simpler patterns and also executed in parallel.

When the fragment's pattern is matched by the local data, then the result is sent to the LE server where the query originated. The LE server that received the query from the user collates the responses from the various fragments and performs any last-minute calculations, joins, or functions. After processing the responses, if the LE server detects that the original event pattern has been matched, the response is forwarded to the user.

Network adapters 730 provide a framework to abstract away underlying data sources. In one embodiment, LE server 702 includes an adapter for each data source type. Each adapter can present the same manager API to event query manager 770, and register with the event query manager to enable to the event query manager to be aware of the data sources. Adapters can be configured as either real-time event sources (which may simply be referred to as "event sources") or historical data sources (which refers to data that is stored in a repository). Adapters may include database-type adapters, such as implemented by database single pull 732, and database polling 734. Such adapters can access historical data. Similar adapters may exist for enterprise system, such as implemented by enterprise single pull 736 and enterprise polling 738. Additionally, web service adapters may exist as shown by web service (WS) polling 735. In one embodiment, the framework is provided as a software development kit so that new adapters can be created in a straightforward manner. Adapters may include a filtering capability that can be configured on a per-event-query basis.

Routing engine 740 enables the routing of queries and response to queries. In one embodiment, routing engine 740 is based on a link-state routing protocol that allows event queries and their corresponding responses to be transported multi-hop through a network from a sender to a set of destinations using a description of the receivers in the form of multiple arbitrary identifying descriptive names. Destinations can have multiple names, and these names can be acquired or removed in a dynamic fashion.

Client connections 742 may include discovery 744 and router election 746. Each connection to other LE servers and other clients is discovered, as is understood in the networking arts. Additionally, each LE server can act as an event data router (referred to as an LE router) within the LE system to forward queries and responses through the LE system. As an LE router, the LE server may also engage in router election with neighboring LE servers to determine preferred paths, shortest paths to data, etc.

Inter-server connections 748 enable forwarding between LE servers. In one embodiment, inter-server connections 748 implements a Hierarchical Shortest-Path First (HSPF) protocol. With HSPF, each LE router has a routing table entry for each destination in the network. Each entry contains information on a destination's event and data content, IP address, and the shortest path to the destination. The destination for a message is defined as the event or data content that is sought. When forwarding a message, an LE router uses its routing table information to determine the specific final destinations that contain that event or data content and then forwards the message on the shortest path to those destinations. Because the destinations for a message are described using event or data content, this allows for a decoupling of event consumers and event producers, which, in turn, allows for new destinations, locations, or companies, to be added quickly in an uncoordinated fashion and without requiring that the system be reprogrammed in any way.

From one perspective, HSPF can be considered a variation of the standard Internet link-state routing protocol Open Shortest-Path First (OSPF). Use of a protocol having similarities to OSPF allows LE to have the following advantages: 1) automatically discover nearby LE servers and create connections between them using the OSPF HELO protocol; 2) dynamically distribute network knowledge throughout the LE topology; 3) dynamically adjust to network topology changes, such as server connections going down; 4) use of router election protocols to enable each location to have a primary LE server and a "hot stand-by" in case of a failure of the primary server; and, 5) use of hierarchical routing to scale to large numbers of destinations and to hide the organization of different hierarchy areas from each other (such as when different areas correspond to different companies).

However, HSPF, as being based on OSPF has limitations. For instance, OSPF is a logical protocol that only understands network links and the computer nodes on those links and has no knowledge of the enterprise event and data content on them. HSPF extends OSPF by inserting content information in the LE system in the form of bit vectors into the routing tables so that the LE routers understand the enterprise data that is available on those networks and computer nodes. Also, OSPF only allows two levels of hierarchy, which limits it to a theoretical maximum of 200 companies and 4000 destination computer nodes. HSPF extends OSPF further to enable an arbitrary number of hierarchical levels to reach many thousands of companies and destinations. The OSPF HELO protocol only creates automatic connections between routers. HSPF implements a variation of the HELO protocol to automatically detect and connect routing clients.

Once a message has been forwarded all of the way from the sender to all of the destinations, the routers will have created a one-to-many shortest-path routing tree with the "root" at the sender and the "leaves" at all of the destinations. Such a routing tree is called a session and soft-state at each router, in the form of a routing cached, and is used to maintain and manage a record of this session. Because probabilistic equations are used for the indexing for engineering trade-off reasons, false positives may result during the forwarding phase. Final checks at the destinations are performed and, if false positives are detected, those routing paths may be pruned as a result.

In accordance with the above, inter-server connections 748 include HSPF forwarding 750, and session management 752. HSPF forwarding is routing in accordance with the HSPF protocol. Session management 752 implements the session and soft-state principles mentioned above. Also in accordance with the above, router connections 754 implements the connections to other LE servers as routers for event data. HSPF linkstate 756 indicates the link state of neighboring LE servers. Discovery 758 enables a router to discover other routers and a shortest path to a data source.

Indexing 758 allows the use of the indexing mentioned above, through which routing can be implemented. In LE routing, the system is designed to allow computer hosts to have multiple descriptive names, such as the event types that they offer. Furthermore, these names or characteristics can be acquired or removed by a host in a dynamic fashion with little overhead. Using hash-based probabilistic equations, these names are encoded into bit vectors to implement bitvector indexing 762. Bitvector indexing 762 allows bit vectors to encode only the existence of the descriptive names. Because only existence information is stored, compression ratios of 200:1 have been achieved. The bit vectors can then be managed by bitvector management 764 using standard vector mathematics to easily merge, compare, and normalize their vector lengths.

Output adapters 704 are designed to give multiple options for forwarding results for user access. Result sets can be sent directly to an application via a web service, stored for later perusal in an event store, and sent directly to a user via email, instant messaging, or SMS. In one embodiment, LE server 702 monitors a user's online presence determine the right output adapter to use accordingly.

The LE system as described herein is designed to be deployed in a single location, multiple locations, and/or in multiple companies. Single location deployment involves deployment on a single physical server (typically) or on multiple physical servers. Deployment of the various LE system components can be performed, for example, by implementing the LE in Java, and having a Java runtime engine installed on the server. Multiple location deployment involves installation of at least part of the LE system components, but all LE system components are not needed at each location. An administrator could push only the necessary components to the different locations. In a multiple location scenario, the individual components are designed to automatically discover each other and establish connections between each other. In one embodiment, the servers should be on the same LAN subnet for the individual components to find each other. Alternatively the servers can be specifically configured to connect to each other.

Additionally, multiple company deployment is possible by implementing a multi-location scenario across firewalls between the companies. In one implementation, a secure point-to-point connection is established across the firewalls, while in another implementation, a trusted third party enables the connection. The two companies can create a secure point-to-point connection, such as a VPN tunnel, between the two companies. The LE installations within each company can then be joined together by connecting their network routers. Since LE system routers are able to route multi-hop between them, it is possible to route event queries and result sets through a trusted third party. In this case, the third party at least enabled as an LE router by the LE system components necessary to implement the LE router (e.g., routing engine 740). Both companies would then make secure connections to the third party and connect their LE system routers to the third party's LE router.

Figure 8:
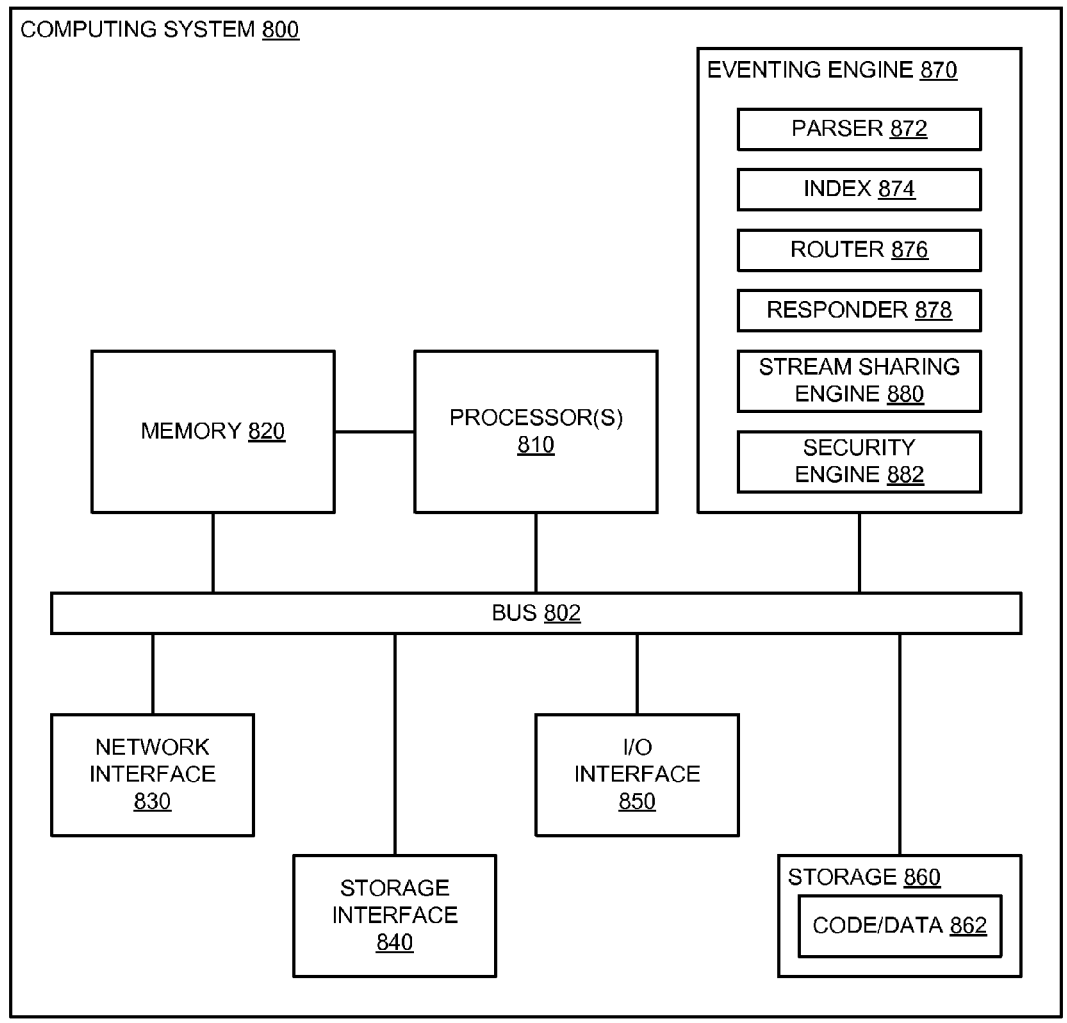
FIG. 8 is a block diagram of an embodiment of a computing system on which embodiments of the invention can be implemented.

FIG. 8 is a block diagram of a computing system on which embodiments of the invention can be implemented. Computing system 800 represents hardware that might execute one or more event server nodes, or LE nodes as described herein. Computing system 800 is depicted with various components that may be present in whole or in part, and additional components or subcomponents may also be present. Computing system 800 includes one or more processors 810, which executes instructions and may perform various operations as described herein. Processor 810 may include any type of microprocessor, central processing unit (CPU), processing core, etc. Processor 810 controls the overall operation of the computing system 800, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 820 represents the main memory of the computing system 800, and provides temporary storage for code (e.g., software routines or series of instructions, commands, operations, programs, data, etc.) to be executed by processor 810. Memory 820 may include read-only memory (ROM), flash memory, one or more varieties of random access memory (RAM), or the like, or a combination of such devices. Memory 820 stores data and instructions for performing operations, including interacting with user clients, data sources, and/or other event server nodes.

The various components of computing system 800 are coupled to bus 802. Bus 802 is an abstraction that represents any one or more separate physical buses, communication lines, and/or point-to-point connections, connected by appropriate bridges, adapters, and/or controllers. Therefore, bus 802 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Computing system 800 includes network interface 830, which represents hardware and software (e.g., drivers) that enable computing system 800 to communicate with remote devices (e.g., clients, data sources, and/or other event server nodes) over one or more networks. Processor 810 may execute various network stacks to control interfaces to various networks through network interface 830. Computing system 800 may include storage interface/adapter 840, which enables computing system 800 to access attached storage (e.g., a storage area network or other storage subsystem) and may be, for example, a Fibre Channel adapter, a SCSI adapter, etc. Computing system 800 includes one or more input/output (I/O) interface(s) 850, which may include one or more interface components to connect with other electronic equipment, for example, custom connections, blade adapters, etc. Additionally, I/O interfaces 850 can include video, audio, and/or alphanumeric interfaces through which a user interacts with computing system 800. Computing system 800 may include one or more internal storage device(s) 860. Storage 860 can be any conventional medium for storing large volumes of data in a non-volatile manner, such as magnetic, optical, and/or semiconductor-based disks. Storage 860 may hold code and/or data 862 in a persistent state (i.e., the value may be retained despite interruption of power to computing system 800).

Computing system 800 includes eventing engine 870, which is an abstraction to represent components (software and/or hardware) that enable computing system 800 to participate in an eventing system as described herein. Note that eventing engine 870 may be an instance of an LE server node, and other instances could also be executed on the same hardware. That is, while certain hardware elements are necessary for the execution of an LE server node, that hardware may be shared with other LE nodes, and/or other enterprise server nodes, or other enterprise systems.

Parser 872 enables eventing engine 870 to parse queries into components. Index 874 provides routing information for eventing engine to identify data sources. Router 876 enables eventing engine 870 to route the queries to the identified data sources, including determining a path in the network, and identifying other LE server nodes. Responder 878 enables eventing engine 870 to generate responses to the queries based on the response components received from the data sources. Stream sharing engine 880 enables eventing engine 870 to implement stream sharing to combine duplicate query components into a single stream, as described herein. Security engine 882 enables eventing engine 870 to implement security on the query components, and combine and maintain security access for queries generated by users with different access privileges.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:
    assigning a descriptive name identifier to event data associated with a object in an enterprise system, the descriptive name identifier identifying a data type and data contents of the object, the descriptive name identifier associated with a source of the event data, the object being a structured data object, the data source to store the object and indicate changes to the object as event data, the data source being a data source local to a node of the enterprise system, wherein assigning the descriptive name identifier includes
        generating a name including a string to identify the event data; and
        executing a one-way hash on the string, the hash having a certain bit-length;
        executing multiple hashes on a result of the hash, where the multiple hashes have a bit-length that is shorter than the hash; and
        combining results of the multiple hashes to generate the descriptive name identifier;
    storing the descriptive name identifier at the network node of the enterprise system;
    indexing the descriptive name identifier at the network node with other descriptive name identifiers that define object contents and identify sources of event data within the enterprise network; and
    routing queries for event data based on the indexing to the data sources to obtain the event data from the data sources in real time.

2. The method of claim 1, wherein assigning the descriptive name identifier comprises:
    generating the descriptive name identifier based on a naming algorithm following a convention for describing the data type and data contents.

3. The method of claim 1, wherein the data source is the network node at which the descriptive name identifier is indexed, and wherein assigning the descriptive name identifier further comprises:
    converting an identifier compliant with a local system of the network node to the descriptive name identifier generic to other nodes in the enterprise system.

4. The method of claim 1, wherein assigning the descriptive name identifier comprises:
    assigning an identifier that indicates the data type and data contents via operation of a decoding equation, rather than indicating information as a one-bit-to-one element of information bit map.

5. The method of claim 1, further comprising:
    making the indexed descriptive name identifier available from the network node via a publish and subscribe mechanism where the network node advertises the event data available from the data source associated with the descriptive name identifier, and the descriptive name identifier is subscribed to by zero or more additional network nodes to request event data.

6. The method of claim 1, wherein assigning the descriptive name identifier further comprises:
    assigning a descriptive name identifier having one of multiple levels of precision in identifier data contents, where a descriptive name identifier with more bits has more precision, and different network nodes within the enterprise network index descriptive name identifiers having different levels of precision.

7. The method of claim 6, further comprising:
    determining if the network node at which the descriptive name identifier is to be indexed is an edge node or a core node of the enterprise system, where an edge node is assigned descriptive name identifiers having higher levels of precision than descriptive name identifiers assigned to core nodes.

8. An article of manufacture comprising a machine-readable storage medium having content stored thereon to provide instructions to cause a machine to perform operations, including:
    assigning a descriptive name identifier to event data associated with a object in an enterprise system, the descriptive name identifier identifying a data type and data contents of the object, the descriptive name identifier associated with a source of the event data, the object being a structured data object, the data source to store the object and indicate changes to the object as event data, the data source being a data source local to a node of the enterprise system, wherein assigning the descriptive name identifier includes
        generating a name including a string to identify the event data; and
        hashing the string to generate the descriptive name identifier, including executing a one-way, cipher and hash on the string, the cipher and hash having a certain bit-length, executing multiple hashes on a result of the cipher and hash, where the multiple hashes have a bit-length that is shorter than the cipher and hash, and combining results of the multiple hashes to generate the descriptive name identifier;

storing the descriptive name identifier at the network node of the enterprise system;

indexing the descriptive name identifier at the network node with other descriptive name identifiers that define object contents and identify sources of event data within the enterprise system; and routing queries for event data based on the indexing to the data sources to obtain the event data from the data sources in real time.

9. The article of manufacture of claim 8, wherein the content for assigning the descriptive name identifier comprises content for assigning an identifier that indicates the data type and data contents via operation of a decoding equation, rather than indicating information as a one-bit-to-one element of information bit map.

10. The article of manufacture of claim 8, further comprising content to provide instructions for making the indexed descriptive name identifier available from the network node via a publish and subscribe mechanism where the network node advertises the event data available from the data source associated with the descriptive name identifier, and the descriptive name identifier is subscribed to by zero or more additional network nodes to request event data.

11. The article of manufacture of claim 8, wherein the content for assigning the descriptive name identifier further comprises content for assigning a descriptive name identifier having one of multiple levels of precision in identifier data contents, where a descriptive name identifier with more bits has more precision, and different network nodes within the enterprise network index descriptive name identifiers having different levels of precision; and further comprising content to provide instructions for determining if the network node at which the descriptive name identifier is to be indexed is an edge node or a core node of the enterprise system, where an edge node is assigned descriptive name identifiers having higher levels of precision than descriptive name identifiers assigned to core nodes.

12. A server node of an enterprise network, comprising:

a memory device storing event routing index information, the event routing index information including an index having multiple descriptive name identifiers of event data associated with objects in the enterprise network, each descriptive name identifier identifying a data type and data contents of a object, the descriptive name identifier associated with a source of the event data, the object being a structured data object, the data source to store the object and indicate changes to the object as event data, the data source being a data source local to a node of the enterprise network, wherein the descriptive name identifier is generated by hashing a string identifying type and content of the event data, including executing a one-way, cipher and hash on the string, the cipher and hash having a certain bit-length, executing multiple hashes on a result of the cipher and hash, where the multiple hashes have a bit-length that is shorter than the cipher and hash, and combining results of the multiple hashes to generate the descriptive name identifier;

an index engine to index the descriptive name identifier at the server node with other descriptive name identifiers that define object contents and identify sources of event data associated with objects;

a routing engine to route queries for event data based on the indexing to the data sources to obtain the event data from the data sources in real time; and a network interface circuit to receive a query component from a query source requesting information about one or more events and route the query based on the index.

13. The server node of claim 12, wherein the descriptive name identifier comprises a bit vector, and wherein the index engine further indexes bit vectors from neighboring server nodes and builds a routing table based on bit vectors local to the server node and the bit vectors from the neighboring nodes.

14. The server node of claim 13, the index engine to further apply one or more decoding equations to bit vectors from the routing table to route the query component.

15. The server node of claim 12, further comprising:

a bit vector filter to reduce or expand a bit vector to change a level of precision in identifying data contents from descriptive name identifiers to adjust a routing behavior of the server node.

* * * * *